Figure 1:
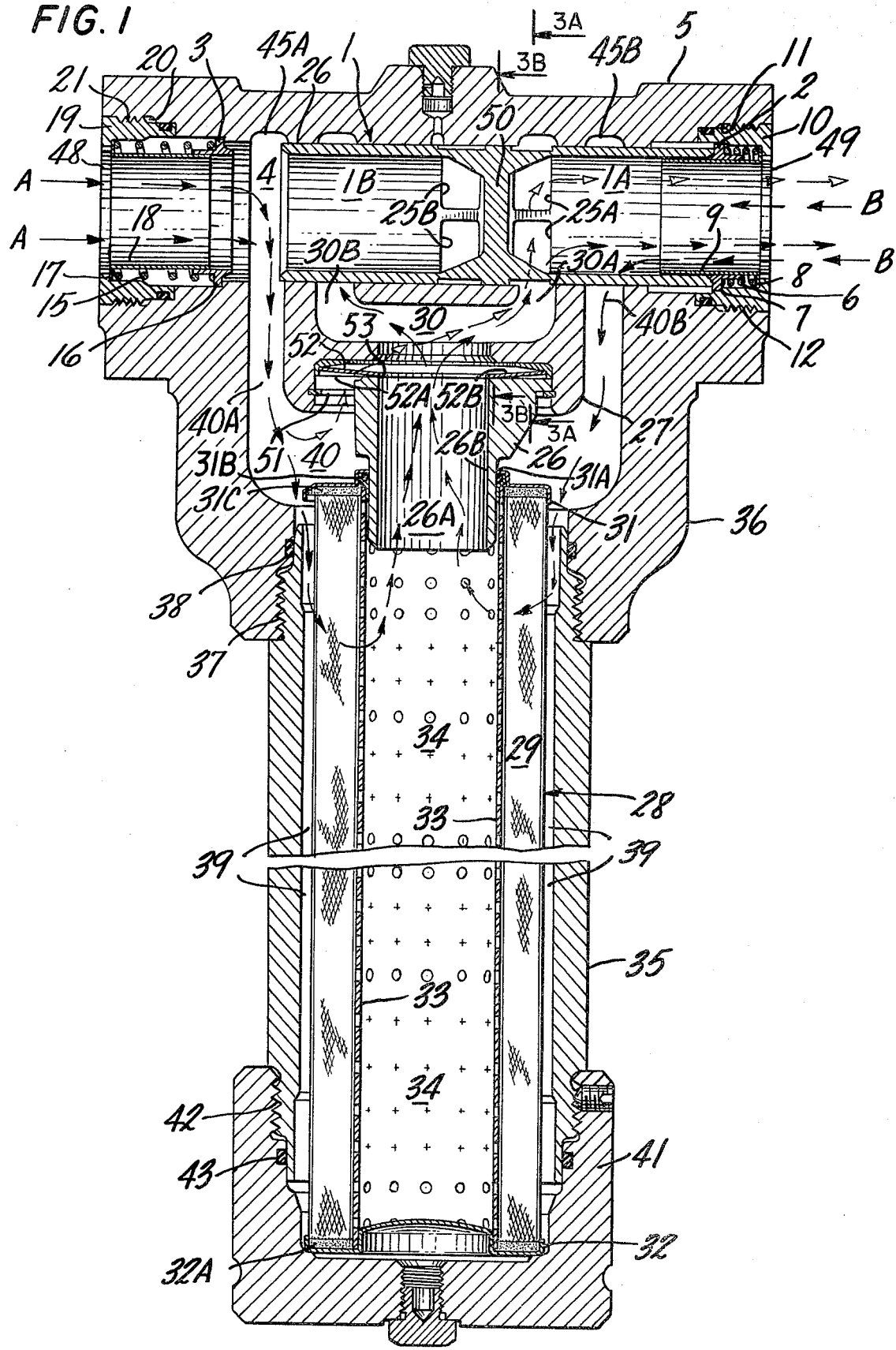

United States Patent [19]

Martin

[11] 4,439,984
[45] Apr. 3, 1984

[54] COAXIAL BIDIRECTIONAL SPOOL VALVE

[75] Inventor: Francis Martin, Huntington, N.Y.

[73] Assignee: Pall Corporation, Glen Cove, N.Y.

[21] Appl. No.: 284,908

[22] Filed: Jul. 20, 1981

[51] Int. Cl.³ .................. B01D 27/10; F16K 17/26
[52] U.S. Cl. ........................................ 60/454; 92/78;
137/493.9; 137/549; 210/130
[58] Field of Search ............... 60/454, 453, 353, 336;
91/468, 455, 456; 92/78; 137/493, 493.9, 513,
549; 210/130, 134, 136

[56] References Cited
U.S. PATENT DOCUMENTS

| 2,934,080 | 4/1960 | Rice | 137/493.9 |
| 4,003,397 | 1/1977 | Cooper | 60/454 |
| 4,009,572 | 3/1977 | Cooper | 60/454 |

Primary Examiner—Robert E. Garrett
Assistant Examiner—John M. Husar

[57] ABSTRACT

Coaxial bidirectional spool valves are provided for use in fluid systems such as hydrostat systems where flow can proceed in opposite directions, and which direct flow through a unidirectional or multidirectional function such as a filter assembly in the normal direction regardless of the direction of flow in the system. The valve includes a spool valve reciprocably movable between two limiting positions according to fluid pressure differential across the valve and engaging one of a pair of bungee followers in each position, thereby intercepting and controlling flow through a box junction of the fluid line with the lines leading to and from the filter assembly in a manner such that, regardless of the direction of flow in the fluid line, flow proceeds in the same direction in the connecting fluid lines to and from the function.

25 Claims, 6 Drawing Figures

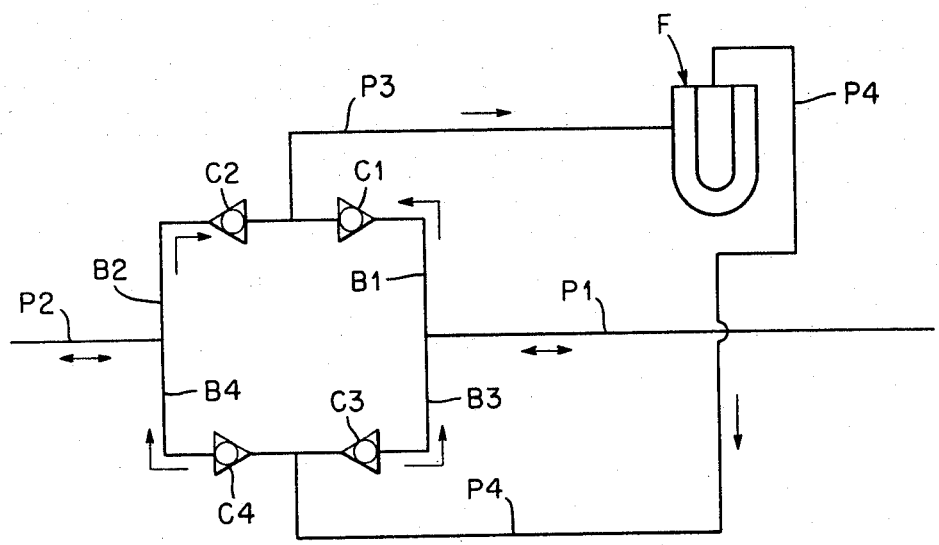
*FIG. A*
PRIOR ART
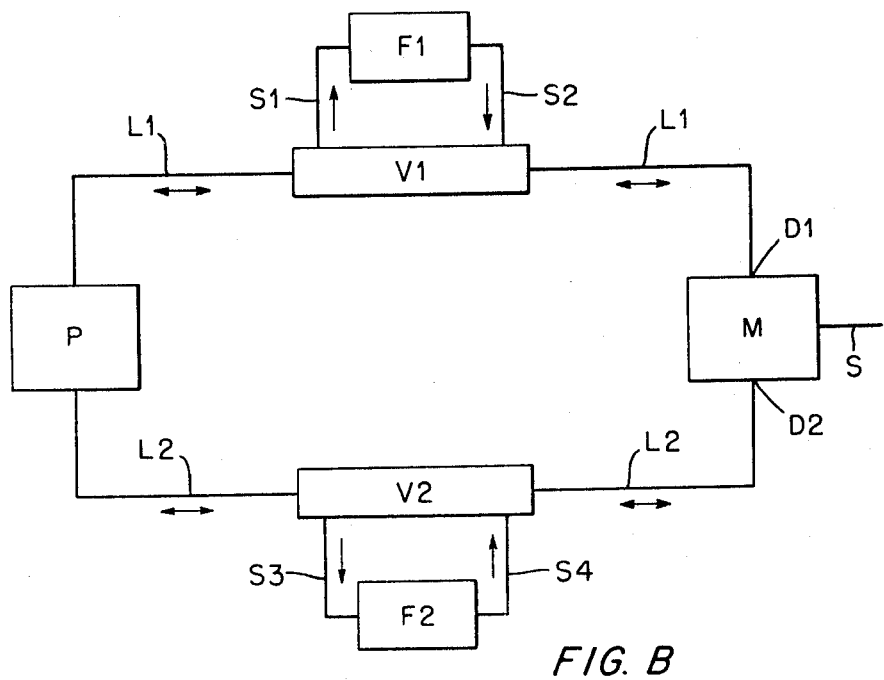
*FIG. B*

COAXIAL BIDIRECTIONAL SPOOL VALVE

Hydrostat systems are composed of a hydraulic pump and a hydraulic motor coupled together in a closed fluid flow loop or circuit to provide a fluid drive for vehicles and to operate light and heavy-duty machinery, such as tractors and earth-moving equipment and paper mill machinery. The pump operates the motor by pumping the fluid to the motor, which returns the fluid to the pump, and the motor in turn rotates an axle or other rotating member to drive the vehicle or machinery.

Operation in either direction can be obtained in the same system by control of the direction of flow of fluid through the system, and the side of the motor to which the fluid is pumped. Fluid entering the motor from a first direction drives the motor in one direction, while fluid entering the motor from a second direction drives the motor in the opposite direction. The motor thus can drive the vehicle or machinery in either direction, according to the direction of flow of the fluid from the pump to the motor.

The fluid flow between the pump and the motor is normally in a closed circuit through either of two fluid paths, one path being followed for clockwise operation and the other path being followed for counterclockwise operation, and the fluid paths enter opposite sides of the motor so as to drive it clockwise or counterclockwise, for operation in one direction or the other, which may be forward or reverse.

The fluid paths are in a closed flow loop or circuit of the type shown in FIG. B, and each path carries forward or reverse flow, according to the direction of flow through the system required for the desired operation.

The terms "clockwise" and "counterclockwise" are applied herein to the direction of operation of the fluid drive; clockwise or righthand flow operates the drive in one direction, and counterclockwise or lefthand flow operates the drive in the opposite direction.

The terms "forward" and "reverse" are herein applied to the direction of flow of fluid through a given fluid path of the system between the pump and the motor. Forward flow is from the pump to the motor, and reverse flow is from the motor to the pump in the same fluid path.

Flow through a unidirectional function in the functioning direction is referred to as "normal" flow. The valve of the invention ensures that flow in the system in either direction enters the unidirectional function in the same and normal direction.

It is thus seen that "forward" as applied to the direction of flow in the fluid path coincides with and refers to the flow direction required for either clockwise or counterclockwise operation.

Because the system operates the drive by fluid flow, and because the wear of the moving parts tends to introduce foreign particles, bits of metal and other debris into the hydraulic fluid circulating through the system, it is customary to provide a filter in each fluid path, to filter the fluid, and thus clean the fluid from any particles which might damage the moving parts of the motor and pump. The filter is usually interposed to clean the fluid during forward flow from the pump to the motor. The filter can also be interposed to filter the fluid during flow from the motor to the pump. Provision for normal flow through the filter to filter flow in either flow direction in the system ensures that only clean fluid is supplied to the motor and the pump.

In such systems, therefore, it is desirable to provide for flow through the filter element in either direction of flow in the system. In this situation, it is necessary to ensure that the flow through the filter proceeds in the same or normal direction, whether or not the fluid flow through the system is in forward or in reverse flow. Otherwise, on reverse flow the contaminants on the opposite of the filter are unloaded and returned to the stream.

This can be accomplished by a combination of four check valves in a four-branch flow circuit providing a box junction intercepting the two fluid lines, which enter the box junction at opposite sides and at a 90° angle to each other. The check valves permit flow only in one direction in each branch of the box.

Such a box junction circuit is shown in FIG. A having four check valves C1, C2, C3, C4, one in each of the four branches of the box junction. If the symbol——be understood as representing a check valve with free flow from left to right and zero flow from right to left, then it will be apparent that if flow is inward at P1, it progresses via the right branch B1 through the check valve C1 into the line P3 leading to the filter assembly F and thence via line P4 and the left branch B4 through check valve C4 to the line P2. If the flow is inward at line P2, it proceeds via the left branch B2 through the check valve C2 to line P3, and again to the filter assembly in the same direction, and thence through line P4 via the right branch B3 and check valve C3 to line P1.

The principle of utilizing a box junction in this manner has been known for many years, but it is not widely used because the conventional check valves required with associated piping for the box junction are costly, offer a very high pressure drop, and occupy a large amount of space. Consequently, in the usual hydrostat system one is normally content to interpose the filter so as to clean flow during one direction but not the other.

If the filter is arranged in this way, however, the system requires some means for controlling reverse flow so that it does not pass through the filter. Therefore, it is customary to provide a bidirectional valve in the hydrostat system, which under forward flow directs fluid through one path by way of the filter, and under reverse flow directs fluid through another path bypassing the filter.

The design of a bidirectional valve that will meet the pressure and rapid flow reversal requirements of modern hydrostat systems has posed numerous problems, and the bidirectional valves heretofore available have not been fully satisfactory in meeting the requirements. Many such systems require a high speed of reversal of the drive, within from 40 to 50 milliseconds. The bidirectional valves that have been used are not capable of responding so quickly, and consequently there is a time lag in the reversing, which is undesirable.

Another difficulty posed by hydrostat systems which must be met by bidirectional valve s is the necessity of passing full flow in either direction immediately, to avoid starvation of the motor and/or pump. This poses a design problem in any valve which is responsive to a differential fluid pressure across the valve. The usual design of valve, such as the ball-and-poppet and the Belleville washer, is responsive to a sufficient fluid pressure differential across the valve to provide a lare valve opening at a high differential pressure, and a lesser valve opening at a lower differential pressure. Once the valve has opened a little, the pressure differential across the valve decreases, with the result that it becomes impossible to open the valve any further. The larger the flow required, the larger the valve element that is needed to expose a large opening, and this increases the differential pressure required to open the valve. Moreover, the larger the valve, the larger the mass of material which has to be put in motion to open the valve. For these reasons, the design of a bidirectional valve that is capable of operating in a confined space, has a low mass, and opens quickly to provide for full flow immediately upon change of flow direction, has proved to be a complex and perplexing problem.

The result of these difficulties has been an inability to resolve the problems posed by a box junction provided with check valves and to provide a hydraulic system which is capable of providing for flow in the same direction through a filter element regardless of the flow direction through a fluid line or system, such as a hydrostat system.

In accordance with the invention U.S. Pat. No. 3,985,652, patented Oct. 12, 1976, a dual coaxial bidirectional flow-control valve is provided, responsive to flow from either direction by way of pressure-actuating surfaces to open when flow begins from either direction, and to close when flow stops. The valve is especially designed for use in the fluid lines of hydrostat systems and other systems where bidirectional flow can be encountered. The valve is arranged to direct flow from either direction in the fluid line in which it is interposed to a function, such as a filter element, through one path, and from the function, such as a filter element, through another path, returning it to the fluid line for flow in either direction from the valve.

Thus, the valve combines in a single unit a box junction of the type shown in FIG. 1, and is responsive to fluid flow in either direction through a fluid line P1, P2, to direct fluid flow in the same direction through line P3 to the filter element and line P4 from the filter element, and then back to the fluid line.

The dual valve comprises first and second coaxial tubular valves, each with first and second tubular valve elements reciprocating between open and closed positions along a longitudinal axis. The two valves are linked in their response to fluid flow, so that when one of the first and second tubular valve elements of the first valve is open, for flow in one direction, one of the first and second tubular valve elements of the second valve is also open, for flow through the combined valves in the same direction, and the other tubular valve elements of each valve are closed. Similarly, when the other of the tubular valve elements of the second valve is open for flow in the other direction, the other of the tubular valve elements of the first valve is also open, for flow through the combined valves in the other direction, and the one tubular valve elements of each valve are closed.

One of the tubular valve elements of each of the first and second valves controls flow to the line leading to one side of the function, such as a filter element, and the other of the tubular valve elements of the first and second valves controls flow from the line leading from the other side of the function, such as a filter element.

The dual valve can thus be inserted in-line or within the fluid line, utilizing a portion of its open central flow space to accept the reciprocating movement of the two sets of valve elements. The reciprocating valve elements of each valve are each provided with pressure-actuating surfaces, but on opposite sides, so as to be responsive to fluid pressure arising from flow of fluid in opposite directions through the fluid line, one of the valve elements of the each valve being responsive to flow in one direction through the fluid line, and other valve elements of the each valve being responsive to flow in the opposite direction through the fluid line.

During flow in one direction, one of the reciprocating valve elements of the first valve under force applied to its forward pressure-actuating surface moves into a first position in which it directs forward flow through one path, such as to a filter. Upon reversal of flow, a pressure-actuating surface responsive to reverse flow on one of the reciprocating valve elements of the second valve receives reverse flow fluid pressure in a manner to move that valve element into an open position, to direct flow through the same path, such as to the filter element.

Similarly, the other reciprocating valve element of the second valve, under a force applied to its forward pressure-actuating surface, moves into a first position in which it allows flow from another fluid path, such as from the other side of the filter element, to proceed. Similarly, upon reversal of flow, a pressure-actuating surface responsive to reverse flow on the other reciprocating valve element of the first valve receives reverse fluid pressure in a manner to move that valve element into an open position to receive flow in the same fluid path, such as from the other side of the filter element. Thus, one of the valve elements of each valve controls flow to the same first line in the same direction, on the same side of the function, such as a filter, and the other valve element of each valve controls flow from the same second but different line, in the same direction, on the other side of the function.

In accordance with the present invention, a coaxial bidirectional flow control spool valve is provided, responsive to flow from either direction by way of opposed fluid pressure-responsive actuating surfaces, to permit flow to proceed through a box junction in the fluid line in fluid flow connection with a unidirectional function such as a filter assembly to convert flow through the box junction from either direction, when flow begins from that direction, into flow in the same direction through the function. The valve is especially designed for use in the fluid lines of hydrostat systems and other systems where bidirectional flow can be encountered. The valve is arranged to direct flow from either direction in the fluid line in which it is interposed to a unidirectional function such as a filter element through one path, and from the function such as the filter element through another path, returning it to the fluid line for flow in a continuing direction as originally tapped from the fluid line.

Thus, the valve combines in a single unit a box junction of the type shown in FIG. A, and is responsive to fluid flow in either direction through a fluid line P1, P2, to direct fluid flow in the same direction through line P3 to the filter element, and line P4 from the filter element and back to the fluid line.

The valve comprises a spool valve reciprocating between two limiting positions along a longitudinal axis, into and away from actuating contact with a bungee follower in each of the said limiting positions. The spool valve and one of the bungee followers are linked in each of the limiting positions in their response to fluid flow, so that when the spool valve is in one position, it together with the bungee follower accepts flow from one direction and directs it through one path to a unidirectional function, such as the filter element, and through one path from the function, such as a filter element, receiving and returning the flow to the fluid line, and when the spool valve is in actuating contact with the other bungee follower, in the other limiting position, the valve and bungee follower accept flow through the fluid line from the opposite direction, and direct it through the same fluid path to the unidirectional function such as a filter element and also accept flow from the same path from the unidirectional function such as the filter element and direct this flow back into the fluid line continuing in the same opposite direction.

The spool valve can thus be inserted in-line or within the fluid line in a box junction in a manner to accept the reciprocating movement of the spool valve between its limiting positions. The spool valve is provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower.

During flow in one direction, the reciprocating spool valve, under fluid pressure differential arising from forward flow applied to its forward pressure-actuating surface, moves into a first limiting position, in which it directs forward flow through one path such as to a filter. Upon reversal of flow, the fluid pressure differential arising from reverse flow, applied to the reverse pressure-actuating surface on the opposite side of the reciprocating spool valve, moves the reciprocating spool valve into the opposite limiting position, to direct flow through the same path and receive flow from the same path, such as to and from the filter element.

The hydrostat system provided in accordance with the instant invention comprises a pump; a motor; a fluid line operatively connecting the pump with the motor and arrange to carry fluid flow therebetween in either direction; a function such as the filter interposed in the fluid line between the pump and the motor, for filtration of fluid both in forward flow from the pump to the motor, and in reverse flow from the motor to the pump; and a coaxial bidirectional flow control spool valve in fluid flow controlling connection with the fluid line between the motor and the pump, and with fluid lines leading to and from the function in series flow connection therewith, one on one side thereof, and one on the other side thereof; the valve directing fluid flow in the same or normal direction through the function via the lines in series flow therewith, regardless of flow direction in the fluid line between the motor and the pump, sensing and responding to fluid pressure arising from the direction of fluid flow to direct both forward and reverse fluid flow in the same or normal direction through the function.

The coaxial bidirectional flow control spool valve in accordance with the invention comprises, in combination, a valve housing; a reciprocable spool valve in the housing, having side sealing surfaces, reciprocable within the housing between first and second limiting positions, respectively, along the valve seal; a fluid pressure-receiving surface operatively connected to one side of the reciprocable spool valve; and a second fluid pressure-receiving surface operatively connected to the opposed side of the spool valve; differential fluid pressure arising from fluid flow in either direction in the fluid line applied to the first and second pressure-receiving surfaces urging the valve in opposite directions, towards or away from one of its limiting positions; first and second bungee followers, each disposed to be actuated in one of the limiting positions of the reciprocating spool valve, the first bungee follower being actuated by the spool valve in its first position, and the second bungee follower being actuated by the spool valve in its second position; first and second bias means urging the first and second bungee followers, respectively, in one direction, and the spool valve urging the bungee followers in the opposite direction; first and second flow paths in the valve housing for connection in series to opposite sides of a function and in fluid flow connection with each other via the function; third and fourth fluid flow paths in the spool valve for connection in series to a fluid line, accepting fluid flow therethrough in either direction; fluid flow connections controlled by the spool valve and bungee followers between the first fluid flow path and each of the third and fourth flow paths and between the second flow path and each of the third and fourth fluid flow paths; one of the bungee followers and the reciprocating spool valve in one limiting position of the spool valve permitting flow through one of the fluid flow connections only between the third fluid path and the first fluid path, and between the second fluid path and the fourth fluid path, and the other of the bungee followers and the reciprocating spool valve in the other of its limiting positions permitting flow through one of the fluid flow connections only between the fourth fluid flow path and the first fluid flow path, and between the second fluid flow path and the third fluid flow path, so that fluid flow in either direction through the third and fourth fluid flow paths is directed in the same direction through the first and second fluid flow paths of the housing.

The filter assembly provided in accordance with the invention comprises a first fluid line arranged to carry fluid flow therethrough in either direction; a filter interposed in the fluid line for filtration of fluid either in forward fluid flow or in reverse flow therethrough; and a coaxial bidirectional flow control spool valve as described above in fluid flow connection with the fluid line and with the filter and controlling flow therebetween, interconnected with the filter by at least two additional fluid lines in series flow connection, one on the upstream side and one at the downstream side of the filter, and controlling flow between the first fluid line and the lines in series flow connection to provide flow in the same direction through the filter from either direction of the flow through the fluid line, the spool valve directing flow from one direction through the filter in one direction and directing flow from the other direction through the filter in the same direction.

In a preferred embodiment of the invention, the coaxial spool valve and bungee followers are coaxial, and have open centers constituting flow passages, the reciprocating spool valve having a septum separating the central flow passage therethrough into portions upstream and downstream of the function, so that fluid flow is provided through a fluid path through the open centers of the bungee followers and separate portions of the open center of the spool valve.

Accordingly, reciprocation of the spool valve opens or closes flow passages extending laterally of the valve through or at one end of the tubular housing.

By utilizing an open tubular passage of the bungee followers and at least a portion of the spool valve for fluid flow, the valve of the invention becomes capable of passing larger fluid flows at lower pressure drops than other designs of valves, and the movable valve elements are lighter in weight, have less inertia, and so move more quickly between open and closed positions, perhaps even within several milliseconds.

Because of the coaxial tubular feature, the coaxial tubular spool valves of the invention are capable of passing fluid flows equal to the capacity of the line in which they are interposed, even in a box junction within a very limited space.

Sealing means can be provided at the side of the spool valve and bungee followers and the valve housing, to prevent fluid leakage therebetween through the valve. The sealing elements are not essential; a fluid-tight fit can also be employed, and is preferred, especially at high fluid pressures such as may be encountered in hydrostat systems.

The valve can control flow through any unidirectional or multidirectional function. By "unidirectional function" is meant any function through which flow must pass in one direction only, in order to realize that function, such as a filter, a flow meter, a fluid system provided with alternative but nonmixed sources of supply, and similar. By "multidirectional flow" is meant any function through which flow may pass in either of two directions in order to realize that function, such as a reversible hydraulic motor, hydraulic cylinder, and the like.

Figure 2:
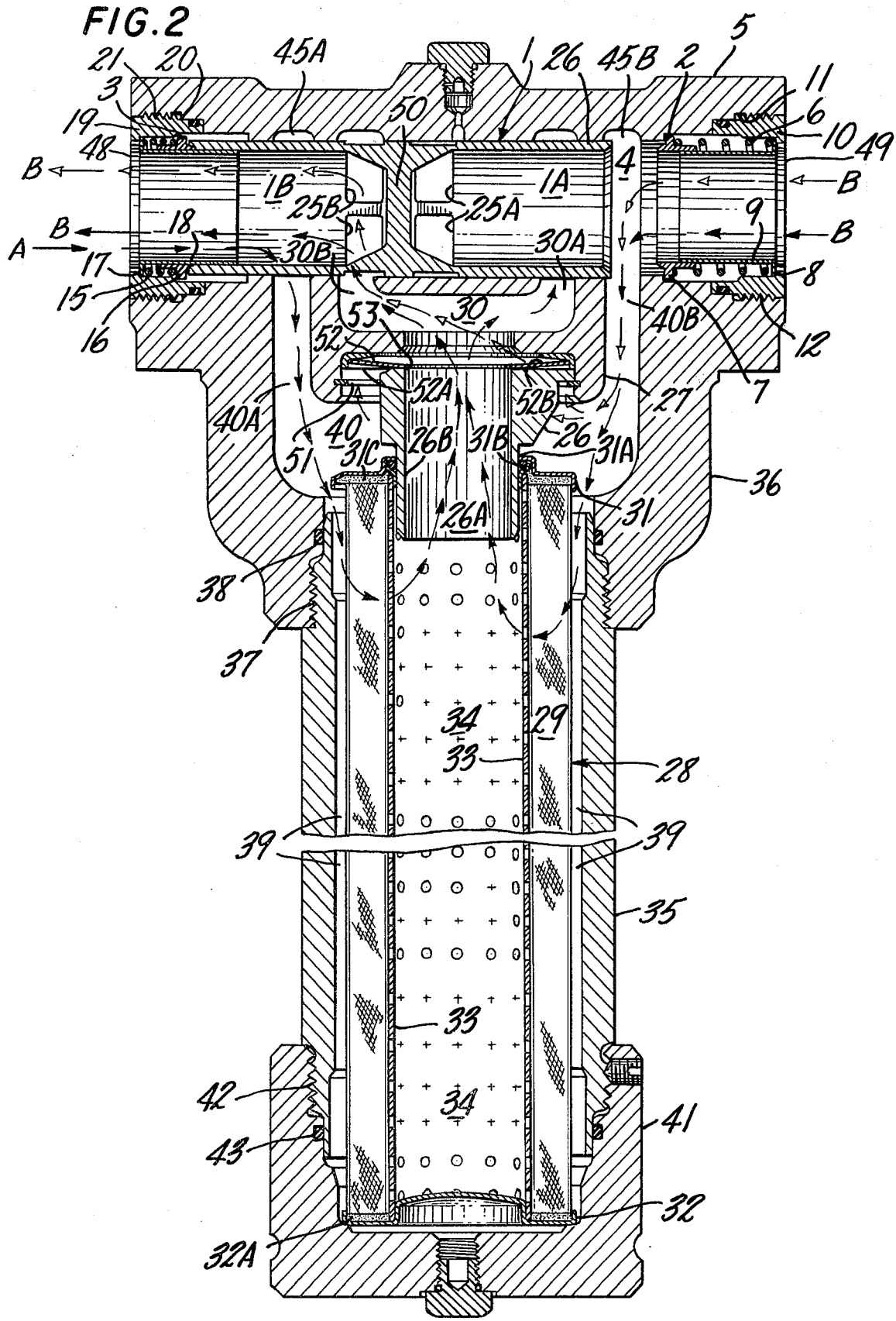
Figure 3A:
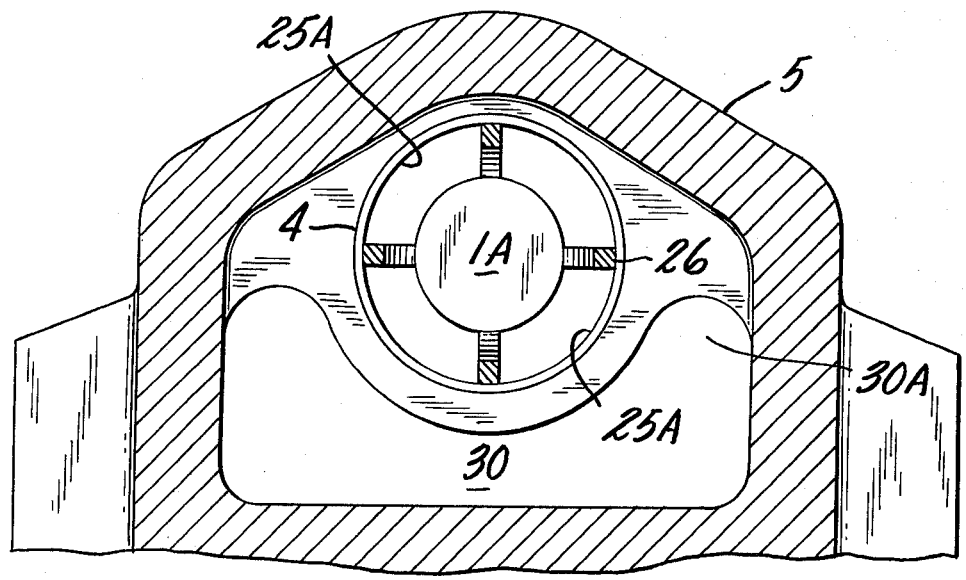
Figure 3B:
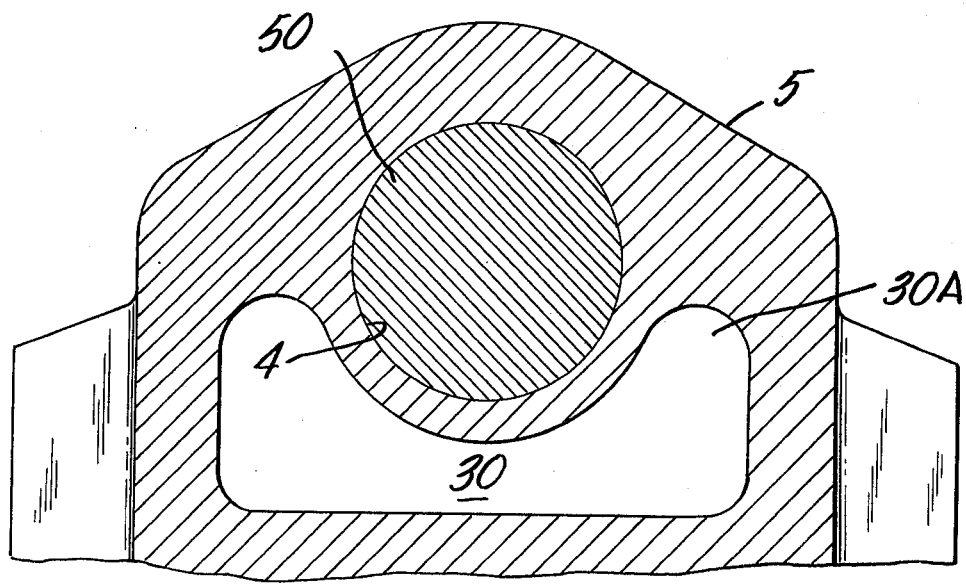

Preferred embodiments of the coaxial spool valve of the invention are shown in the drawings, in which:

FIG. A is a flow diagram showing a box junction with four check valves as previously used, to provide flow in the same direction through a filter from either direction of flow in a fluid line;

FIG. B is a flow diagram showing a hydrostat system having a pump and a motor connected in a flow circuit by two fluid lines, with a filter assembly and a coaxial valve of the invention in each line replacing the box junction of FIG. A, so that flow is filtered in each direction of flow in each line between the pump and the motor, and proceeds in the same direction through the filter assembly regardless of flow direction in these lines;

FIG. 1 is a general view in longitudinal section of a filter assembly including a coaxial spool valve in accordance with the invention, in fluid flow connection with a filter element, and showing the spool valve in one of its limiting positions, in actuating contact with one bungee follower, ready to accept flow in one direction through a fluid line;

FIG. 2 is a general view in longitudinal section of the filter assembly of FIG. 1, showing the coaxial spool valve in the other of its limiting positions, in actuating contact with the other bungee follower, and ready to accept flow in the opposite direction through the fluid line, while directing the flow in the same direction through the filter assembly as when in the limiting position shown in FIG. 1;

FIG. 3A is a cross-sectional view taken along the line 3A—3A of FIG. 1, and looking in the direction of the arrows; and FIG. 3B is a cross-sectional view taken along the line 3B—3B of FIG. 1, and looking in the direction of the arrows.

The housing for the dual valve can be in one piece, or separate housing for each valve of the dual valve can be interconnected. Since in most instances the bungee followers will be twins, facing in opposite directions, it may be convenient to fit each bungee follower individually in the housing. The followers can then be replaced individually when worn. The housing can be joined at opposite ends to any desired module having the fluid flow connections leading to the fluid lines to be connected in the box junction controlled by the dual valve. This permits standardized valve housings for use in any arrangement of box junction.

The housing has an internal bearing surface or track along which the spool valve and bungee follower travel during their reciprocating movement between open and closed positions. The bearing surface or track can be an internal wall of the housing, along which these valve elements can move. Alternatively, a bearing insert or sleeve can be placed within the housing, to serve as the valve element track. Such a surface if porous will be self-lubricating, due to the fluid passing through the system filling the pores of the surface or sleeve.

The housing is preferably tubular. For convenience and ease of manufacture, a tubular housing and/or the track are cylindrical, and the tubular valve elements are also cylindrical, and coaxial therewith. However, any other cross-sectional tubular configuration can be used, such as square, triangular, or polygonal. Configurations not round constrain the valve elements to reciprocating movement, and prevent rotation, which is desirable in some systems.

The valve elements have an external configuration matching the bearing surface or track within the tubular housing, for reciprocating movement therealong between their limiting positions. The length of movement of the valve elements is in no way critical, and the bearing surface or track is long enough to accommodate such movement.

Normally, although not necessarily, the valve elements are concentric and tubular, and each has a central passsage therethrough for fluid flow to one fluid path. In this form the valve is particularly adapted to fit in the space provided for the fluid line to which it is connected. The open central passage through the housing and valve elements is closed off at the septum of the spool valve, and open sides of the septum also serve as the pressure-receiving surfaces, at the same time as the septum controls the flow therefrom to the two fluid paths on each side of the function.

The septum or other separators across the open interior of the spool valve thus constitutes opposed pressure-receiving surface, which receive differential fluid pressure arising from flow on each side thereof. The spool valve is operatively connected to the pressure-receiving surfaces in a manner to be urged, when flow begins in one direction, towards either one of its limiting positions as desired, and to move to the other of its limiting positions when flow begins from the opposite direction. The pressure-receiving surface should have a pressure-receiving area sufficient to overcome the biasing force of the bias means urging the bungee followers in the opposite direction to movement of the spool valve, and move the bungee follower in this direction, into its actuated position.

Such a pressure surface is usefully formed in a tubular spool valve element as a wall extending across the open center midway of the tube. It is also possible to provide one or more projecting ledges or vanes or flanges along the outer periphery of the spool valve element. A sealing element or ring operatively connected to the spool valve element at its outer periphery can serve as a pressure surface.

Normally, the bungee followers are arranged to move in opposite directions to an actuated closed or open position, under the impulse of the spool valve, but they can be arranged to move in the same direction.

The paired bungee followers in each position of the spool valve normally together allow flow through the same fluid path to and from the function. When moved, the bungee followers and spool valve expose different passages communicating with this flow path, so that flow in either direction through the fluid line can be redirected into the same fluid path through the function.

The valve elements together thus control flow through the series flow passage through the function. The passage openings can be dimensioned according to the flow required, without regard to the circumference of the valve element.

The exterior of the valve elements can be made to fit with a close clearance against a bearing surface or track of the tubular housing. The clearance can be sufficiently close so that a leak-tight seal is formed therebetween, preventing leakage past the valve.

It is also possible to interpose a sealing element between the exterior of the valve element and the bearing surface or track. Such a sealing element can be fixed to the wall of the tubular housing or to the valve element; in the former it is stationary, and in the latter it reciprocates with the valve element.

One or several bias means is provided, tending to move each bungee follower in a direction opposed to the direction of movement of the spool valve element under the force applied by fluid pressure at the pressure-receiving surface. The spool valve requires no bias means, but one or two bias means can be provided to prevent movement of the spool valve in either or both directions until a predetermined fluid pressure differential is reached. Such bias means thus resists movement of the spool valve towards or away from its shutoff or limiting position under fluid pressures arising from flow up to a predetermined minimum; at higher differential fluid pressures, the force applied to the pressure receiving surface exceeds the biasing force of the bias means, and compels movement of the spool valve in the opposite direction. In each such direction, the valve elements open and close selected flow passages. Thus, the valve elements can be arranged to open and close selected flow passages under such predetermined fluid pressure.

The bias means can take any form. A compression or tension spring is easily fitted in the central passage of the housing, or in a recess, without materially obstructing or reducing the open space available for fluid flow. Magnetic elements can also be used, arranged either to attract or to repel one another, one magnetic element being movable with the valve element, and one being in a fixed location in the tubular housing, where it attracts or repels the element towards or away from the valve seat. In all forms, the bias means impels movement of the valve element in a direction opposed to the direction of the application of the actuating fluid pressure on the pressure-receiving surface. A combination of spring bias and magnetic bias means can also be used.

It is usually convenient to place the two flow passages connected with the fluid line through which flow is controlled to the function by the valve elements at one end of or through the tubular housing, extending coaxially with or endwise to the valve elements. The flow passages leading to and from the function extend laterally of the valve elements and the tubular housing, and are opened only upon the registration of apertures in the sides of the valve elements at predetermined reciprocable positions of the valve elements with respect to the tubular housing.

The spool valves of the invention are particularly adapted for use in hydrostat systems to control flow to and from filter assemblies. If the filter element is retained within a filter housing, the valve housing can be attached to or made a part of the filter housing with the valves arranged to control flow to the outside and the inside of the filter element. One fluid flow connecting passage in the housing, controlled by one side of the spool valve and one bungee follower in one limiting position of the spool valve, opens onto one side of the filter element, while the other fluid flow connecting passage, controlled by the other side of the spool valve and the other bungee follower in the same limiting position of the spool valve, can open onto the other side of the filter element. Like connecting passages are opened and closed in the other limiting position of the spool valve, and accommodate reverse flow in the fluid line for flow in the same direction in the fluid passages to and from the filter element.

The spool valves of the invention can be made of any suitable materials, such as plastic or metal. Stainless steel is a particularly durable material of construction, suitable for most uses, especially in filter elements, because of resistance to attack by fluids, and is preferred both for the valve elements and for the tubular valve housing and other components of the spool valve. It is however, also suitable to make the spool valve of plastic, such as polytetrafluoroethylene, nylon, polycarbonates, phenolformaldehyde, urea-formaldehyde, or melamine-formaldehyde resins. It is also suitable to fabricate the valve housing and valve elements of stainless steel, and interpose a durable plastic sleeve or insert therebetween as a track, such as, for example, polytetrafluoroethylene or nylon.

A particularly advantageous feature of the dual spool valves of the invention is that their construction makes it possible to use sheet metal for the tubular housing and internal sleeve, and for the valve elements. This considerably simplifies their fabrication, and reduces manufacturing costs, as compared to other types of valves in which machined, extruded, or cast components are necessary.

A specific and preferred embodiment of the invention is illustrated in the drawings, which will now be described.

The hydrostat system of FIG. B is a typical closed circuit flow-path system, with a pump P and a motor M interconnected by two fluid lines L1 and L2. Line L1 enters the motor in a position D1, to drive or rotate the motor in the one direction, and line L2 enters the motor in an opposite position D2, to drive or rotate the motor in the opposite direction. In one direction, the motor drives the system in reverse via drive shaft S rotating in the opposite direction. Thus, fluid pumped by the pump P through the line L1 to the motor M drives the system in one direction, such as forward; the fluid pumped by the pump P through the line L2 to the motor M drives the system in the opposite direction, such as in reverse.

In each line L1 and L2, there is a filter F1 and F2, and a coaxial spool valve of the invention, V1 and V2. The lines S1 and S2 interconnect the filter F1 with the valve V1 and the lines S3 and S4 interconnect the filter F2 with the valve V2. The valves V1,V2 control flow through the lines S1, S2 and S3, S4 so that flow proceeds through the filters F1, F2 in the same direction, regardless of the direction of flow through the lines L1 and L2. Whether the flow is in the direction from the pump to the motor or vice versa, in either line L1 or L2, the flow is via lines S1, S2 through the filter F1, and via lines S3, S4 through the filter F2. Since fluid proceeds from the pump to the motor in one line, and returns to the pump in the other line, the flow in each line in each direction is always filtered.

In operation, when flow proceeds forward from the pump to the motor in line L1, the valve V1 in response to the resulting fluid pressure in the forward direction opens lines S1, and flow proceeds via the filter F1 and line L1 to the motor M. Return flow via the line L2 to dual valve V2 causes the valve V2, in response to the resulting fluid pressure in the return direction, to open line S3 so that return flow proceeds via line S3 through the filter F2 and line S4 and line L2 to the pump.

A reversal of the pump reverses the direction of flow in lines L1, L2, but not the direction of flow through the filters F1 and F2. Flow now proceeds via line L2 to the valve V2. In response to the resulting fluid pressure in the forward direction, valve V2 opens line S3 so that flow proceeds via the filter F2 and lines S4 and L2 to the motor. Return flow via line L1 causes valve V1 in response to the resulting fluid pressure in the return direction to open line S1, so that flow proceeds through the filter F1 and lines S2 and L1 to the pump.

The coaxial spool valve shown in FIGS. 1 to 3 comprises a reciprocating spool valve 1 movable between the two limiting positions shown in FIGS. 1 and 2. In the position shown in FIG. 1, the spool valve 1 is in actuating contact with the coaxial cylindrical bungee follower 2, and in the limiting position shown in FIG. 2 the spool valve is in actuating contact with the coaxial cylindrical bungee follower 3. Each of the bungee followers 2, 3 is also reciprocably movable, in accordance with its actuation by the spool valve 1.

The spool valve and bungee follower reciprocate within a through tubular passage 4 in the housing 5. A compression spring 6 biases the bungee follower 2 towards the left, being retained at one end against the ledge 7 of the bungee follower, and at the other end against the flange 8 of the tubular spring retainer 9 serving as a concentric internal track for the bungee follower 2 and held by insert 10 fitted into a recess 11 of the tubular passage 4. The insert 11 can be held to the housing 5 by any means, such as a spring clip or retaining ring, but in this instance is threadably engaged with corresponding threads 12 on the wall of the recess 10 of the housing 5.

Similarly, the bungee follower 3 is biased by the compression spring 15 to the right, the spring being retained against the flange 16 of the bungee follower 3 and flange 17 of the tubular spring retainer 18, serving as a concentric track for the bungee follower 3, and held by the insert 19 fitted in the recess 20 of the tubular passage 4, and held in the housing by threaded engagement with the threads 21 on the wall of the recess 20 of the housing 5.

As seen in FIG. 1, when the spool valve 1 is in actuating contact with the bungee follower 2, the follower is forced against the biasing force of the spring 6 into its right limiting position, with the spring compressed to its utmost extent. In this position of the spool valve 1, the ports 25A of the valve 1 are in fluid flow connection with the righthand leg 30A of the passage 30 of the housing 5, while the end 26 of the valve is beyond and so lays open a fluid flow connection between passage 4 and the leg 40A of passage 40 of the housing 5.

To a dependent portion 27 of the housing there are attached a spider 26 and a filter element 28, in this case cylindrical, with a corrugated filter sheet 29 confined between end caps 31, 32, to which it is bonded in a permanent leak-tight seal 31C and 32A. The cylindrical filter element is supported upon an internal core 33, and has an open interior defining a central through passage 34. The spider has a through passage 26A, and a cylindrical portion 26B, which enters the central aperture 31a of the end cap 31, and a leak-tight seal therewith is ensured by the O-ring seal 31B.

A tubular casing 35 attached at one end to the dependent portion 36 of the housing by, for example, threads 37, as shown, is sealed against the housing by way of the O-ring seal 38, and is spaced a distance from the external surface of the filter element, defining a filter chamber 39. The other end of the tube is closed off by the cap 41, which is attached to the casing 35 by the threads 42, sealed against leaks by the O-ring 43, and closes off that end of the filter chamber.

The passage 40 communicates the filter chamber 39 with the through passage 4, within which reciprocates the spool valve via legs 40A, 40B, passage 40A being open to fluid flow when the spool valve is in the righthand limiting position shown in FIG. 1, and passage 40B being open to fluid flow when the spool valve is in the lefthand limiting position shown in FIG. 2. Passages 40A, 40B each terminate in the annular chamber 45A,45B extending respectively, all the way around the external periphery of the spool valve 1. Thus, when the spool valve 1 is in the position shown in FIG. 1, the passage 40A is open for fluid flow in the direction A into the housing 5 at port 48, from the one side of the spool valve, while the passage 40B is closed, and in the position of the spool valve shown in FIG. 2, the passage 40B is open to flow into the housing 5 at port 49, from the opposite direction B, on the other side of the spool valve, while the passage 40A is closed.

Similarly, with the spool valve in the position shown in FIG. 1, the passages 30, 30A communicate the open center 34 of the filter element 28 with the through passage 4 and then via ports 25A into the open interior 1A of the spool valve, while with the spool valve 1 in the position shown in FIG. 2, the passages 30, 30B communicate the open center 34 of the filter element 28 with the through passage 4 via the ports 25B of the spool valve, thence into the open interior 1B of the spool valve.

The spool valve 1 has a central septum 50 diverting unfiltered flow in direction A or B from the open interior of the valve in the two portions 1A, 1B adjacent the septum into one of the two passages 40A, 40B and separating this flow from the filtered flow entering the open interior of the valve 1 from one of the two passages 30A, 30B.

It is thus apparent that with the spool valve 1 in the position shown in FIG. 1, flow into port 48 in direction A proceeds via the open interior 1B of the valve and passages 40A,40 leading to the filter chamber 39 and then through the filter 28 into passage 34, and out via passage 30A, ports 25A and the open interior 1A of the spool valve through port 49.

With the spool valve in the opposite position shown in FIG. 2, the fluid flow passage 1A is in fluid flow connection by way of the passages 40B, 40 with the filter chamber 39, and so flow in direction B proceeds from port 49 into the filter chamber 39, through the filter 28, and thence via passages 34, 30 and 30B to and through ports 25B into the open interior 1B of the spool valve to port 48.

The septum 50 serves as a pressure-receiving surface, and, according to the direction of flow A or B, one side always is exposed to fluid pressure on the upstream side of the filter, at passages 45A and 45B, 40A and 40B, and the filter chamber 39, and the other side always is exposed to fluid pressure downstream of the filter in the fluid passages 34, 30, 30A and 30B.

Accordingly, fluid flow in either direction A or B from passages 1A or 1B will give rise to a differential pressure across the septum, arising from the pressure drop created during obstructed flow across the filter element, that tends to drive the spool valve 1 to the right or to the left, in one of the positions shown in FIGS. 1 and 2.

Between the dependent housing portion 27 and the spider 26 there is a relief flow passage 51, permitting bypass flow avoiding the filter element 28 between passages 40 and 30, flow through which is controlled by the Belleville washer 52. It will be seen that the lower surface 52A of the Belleville washer is exposed to upstream pressure in passage 40, on the upstream side of the filter element 28, while the upper surface 52B of the Belleville washer is exposed to downstream pressure in passage 30, on the downstream side of the filter element 28. Since there is a pressure drop across the filter element arising from the filter element's obstruction of flow, and this pressure drop increases as the filter element becomes loaded with contaminants, it will be apparent that at some loading stage of the filter element, the differential pressure across the Belleville washer will exceed the biasing force of the washer at the inner periphery thereof into sealing contact with the valve seat 53 on the spider 26, and the Belleville washer will accordingly be driven away from its seat, thus opening the passage 51 to fluid flow bypassing the filter element. The Belleville washer can be of the snap open type, so that the washer can pass immediately from the closed position shown in FIG. 1 to the opposite fully open position shown in FIG. 2, with the valve fully opened and the passage fully exposed to fluid flow.

In operation, the spool valve is responsive to fluid flow in direction A from left to right through the line L1 or L2 and port 48, and immediately flow begins in this line, proceeding from left to right, it produces a sufficient forward fluid pressure applied to the pressure receiving septum 50 of the valve 1, and moves the valve 1 to its righthand limiting position shown in FIG. 1, thrusting the bungee follower 2 into its righthand limiting position shown in FIG. 1, against the biasing force of the spring 6, and held there while such flow continues.

Thus, in operation with fluid flow in direction A, fluid flow is directed from line 11 or L2 via the passage 4, annular passage 45A, passages 40A and 40 and chamber 39, constituting line S1 or S3 leading to the filter F1 or F2.

After having passed through the filter element 28, fluid flow from the opposite side of the filter element proceeds by way of passages 34, 26A, 30, 30A constituting line S2 or S4 leading from the filter to the passage 4, port 49, and line L1 or L2. Fluid flow proceeds in direction A through the line L1 or L2 and through the filter F1 or F2 while the pump continues to operate in this direction.

If now the flow of fluid through the line L1 or L2 be reversed, so that it is from right to left, the fluid pressure arising from flow exerted against the septum 50 first drops to zero, and then fluid pressure is exerted in the reverse direction B, from right to left, against the fluid pressure receiving surface 50, so that the valve 1 is driven to its lefthand limiting position shown in FIG. 2, thus driving the bungee follower 3 to its lefthand limiting position, shown in FIG. 2, while allowing the bungee follower 2 to return to its normal position shown in FIG. 2, under the biasing force of spring 6. This permits flow to proceed via passage 4 into annular passage 45B and passages 40B and 40, permitting flow to proceed in the same direction as before into the chamber 39 leading to the filter 28, constituting lines S1 or S3 to the filter F1 or F2. After passing through the filter element 28, flow proceeds through the passages 34, 26A, 30, 30B constituting lines S2 or S4 to passage 4, whence flow proceeds through port 48 into the line L1 or L2, still in the reverse direction B, from right to left. Flow continues in this direction through the line L1 or L2 while the pump continues to operate in this direction, but flow through the filter element is still in the same or normal direction.

It is thus seen that flow proceeds through the filter assembly in the same direction, regardless of the direction of flow of fluid through the line L1 or L2.

The valve of the invention is useful as a dual check valve in any fluid system where flow in any line can proceed in either of two directions. While the use of the valve has been described particularly with reference to a hydrostat system, it can be used in other dual flow systems, such as in dead end circuits, as in aircraft brake systems, and brake systems for other vehicles.

Having regard to the foregoing disclosure, the following is claimed as inventive and patentable embodiments thereof:

1. A coaxial bidirectional flow control spool valve comprising a valve housing; a valve seat in the housing; and a plurality of fluid flow passages in the housing; the valve comprising, as valve elements, a spool valve and first and second bungee followers, each reciprocating between two limiting positions along a longitudinal axis, the spool valve moving into and away from actuating contact with a bungee follower in each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one path to a unidirectional function and through one path from the unidirectional function, receiving and returning the flow to the fluid line continuing in the same direction, and when the spool valve is in actuating contact with the other bungee follower, in the other limiting position, the valve and bungee follower accept flow through the fluid line from the opposite direction, and direct it through the same fluid path to the unidirectional function and also accept flow from the same path from the unidirectional function and direct this flow back into the fluid line continuing in the same opposite direction; the reciprocable spool valve having side sealing surfaces, and being reciprocable in the housing between first and second limiting positions, respectively, along the valve seat; a fluid pressure-receiving surface operatively connected to one side of the reciprocable spool valve; and a second fluid pressure-receiving surface operatively connected to the opposed side of the spool valve; differential fluid pressure arising from fluid flow in either direction in the fluid line applied to the first and second pressure-receiving surfaces urging the valve in opposite directions, towards or away from one of its limiting positions; the first and second bungee followers each being disposed in the housing to be actuated in one of the limiting positions of the reciprocating spool valve, the first bungee follower being actuated by the spool valve in its first position, and the second bungee follower being actuated by the spool valve in its second position; first and second bias means urging the first and second bungee followers, respectively, in one direction, and the spool valve urging the bungee followers in the opposite direction; first and second flow passages in the valve housing for connection in series to opposite sides of a function and in fluid flow connection with each other via the function; third and fourth fluid flow passages in the housing for connection in series to a fluid line, accepting fluid flow therethrough in either direction; fluid flow connections controlled by the spool valve and bungee followers between the first fluid flow passage and each of the third and fourth flow passages; and between the second flow passage and each of the third and fourth fluid flow passages; one of the bungee followers and the reciprocating spool valve in one limiting position of the spool valve permitting flow through one of the fluid connections only between the third fluid flow passage and the first fluid flow passage; and between the fourth fluid flow passage and the second fluid flow passage, and the other of the bungee followers and the reciprocating spool valve in the other of its limiting positions permitting flow through one of the fluid flow connections only between the third fluid flow passage and the second fluid flow passage, and between the first fluid flow passage and the fourth fluid flow passage, so that fluid flow in either direction through the third and fourth fluid flow passages is directed in the same direction through the first and second fluid flow passages of the housing.

2. A coaxial bidirectional flow control spool valve comprising a valve housing; and a plurality of fluid flow passages through the housing; and, as valve elements, a spool valve and two bungee followers, each reciprocating between two limiting positions along a longitudinal axis, the spool valve moving into and away from actuating contact with a bungee follower in each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one fluid flow passage to a unidirectional function and through one fluid flow passage from the unidirectional function, receiving and returning the flow to the fluid line continuing in the same direction, and when the spool valve is in actuating contact with the other bungee follower, in the other limiting position, the valve and bungee follower accepting flow through the fluid line from the opposite direction, and directing flow through the same fluid flow passage to the unidirectional function and also accepting flow from the same fluid flow passage from the unidirectional function and directing this flow back into the fluid line continuing in the same opposite direction; the spool valve being provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower; the spool valve and bungee followers being coaxial, and having open centers constituting flow passages, the reciprocating spool valve having a septum separating the central flow passage therethrough into portions upstream and downstream of the function, so that fluid flow is provided through the fluid flow passages through the open centers of the bungee followers and separate portions of the open center of the spool valve, reciprocation of the spool valve opening or closing flow passages extending laterally of the valve through or at one end of the tubular housing.

3. A coaxial spool valve according to claim 2, in which the valve elements are sufficiently light in weight to reciprocate between open and closed positions within several milliseconds.

4. A coaxial spool valve according to claim 2, in which the bungee followers are twins facing in opposite directions, and placed on opposite sides of the spool valve.

5. A coaxial spool valve according to claim 2, in which the valve housing has an internal tubular wall along which the valve elements reciprocate between open and closed positions.

6. A coaxial spool valve according to claim 5, in which the exterior of the valve elements and the internal wall have a close enough clearance to define a fluid-tight seal therebetween.

7. A coaxial spool valve in accordance with claim 2, in which the bungee followers are biased in opposite directions by bias means.

8. A coaxial spool valve in accordance with claim 7 in which the bias means for the bungee followers are separate coil springs.

9. A coaxial spool valve in accordance with claim 2, in which the spool valve and bungee followers are tubular.

10. A coaxial spool valve in accordance with claim 7, in which the bias means urges each bungee follower towards its valve seat, and the spool valve is operatively connected to the bungee follower to urge it away from its valve seat when flow begins from one direction.

11. A filter assembly comprising, in combination, a fluid line arranged for fluid flow therethrough in either of two directions; a filter element in fluid flow connection with the fluid line, so that flow through the line in at least one direction must pass through the filter element; the filter element having a filter sheet arranged in a closed configuration about the internal passage, with end caps across the ends of the internal passage attached to the filter sheet, at least one of the end caps having an aperture therethrough in fluid flow connection with the internal passage; and a bidirectional spool valve in fluid flow connection with the fluid line and the filter element and responsive to differential fluid pressure thereacross arising from flow of fluid in either direction through the line and a valve flow passage to direct flow through the filter in the same direction, the bidirectional flow control spool valve comprising a valve housing; a plurality of fluid flow passages through the housing; and as valve elements a spool valve and two bungee followers, each reciprocating between two limiting positions along a longitudinal axis, the spool valve moving into and away from actuating contact with a bungee follower in each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one fluid flow passage to a unidirectional function and through one fluid flow passage from the unidirectional function, receiving and returning the flow to the fluid line continuing in the same direction, and when the spool valve is in actuating contact with the other bungee follower, in the other limiting position, the spool valve and bungee follower accept flow through the fluid line from the opposite direction, and direct it through the same fluid flow passage to the unidirectional function and also accept flow from the same fluid flow passage from the unidirectional function and direct this flow back into the fluid line continuing in the same opposite direction; the spool valve being provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower.

12. A filter assembly in accordance with claim 11 having a filter sheet arranged in a closed configuration about a central passage, and supported upon an internal core having an open internal passage.

13. A filter assembly in accordance with claim 12, in which the spool valve is disposed across passages leading to the exterior and interior of the filter element, and fluid flow through such passages is controlled by the valve.

14. A filter assembly in accordance with claim 11, comprising a housing within which are disposed both the filter element and the spool valve; the valve being inserted in a bore in the housing, and the filter element being attached to the housing in fluid flow connection with the bore controlled by the valve.

15. A filter assembly in accordance with claim 11, in which the valve comprises a reciprocable spool valve having side sealing surfaces, reciprocable between first and second limiting positions, respectively, along a valve seat; a fluid pressure-receiving surface operatively connected to one side of the reciprocable spool valve; and second fluid pressure-receiving surface operatively connected to the opposed side of the spool valve; differential fluid pressure arising from fluid flow in either direction in the fluid line applied to the first and second pressure-receiving surfaces urging the valve in opposite directions, towards or away from one of its limiting positions; first and second bungee followers, each disposed to be actuated in one of the limiting positions of the reciprocating spool valve, the first bungee follower being actuated by the spool valve in its first position, and the second bungee follower being actuated by the spool valve in its second position; first and second bias means urging the first and second bungee followers, respectively, in one direction, and the spool valve urging the bungee followers in the opposite direction; first and second fluid flow passages in the valve housing for connection in series to opposite sides of a function and in fluid flow connection with each other via the function; third and fourth fluid flow passages in the housing for connection in series to a fluid line, accepting fluid flow therethrough in either direction; fluid flow connections controlled by the spool valve and bungee followers between the first fluid flow passage and each of the third and fourth flow passages and between the second flow passage and each of the third and fourth fluid flow passages; one of the bungee followers and the reciprocating spool valve in one limiting position of the spool valve permitting flow through one of the fluid flow connections only between the third fluid flow passage and the first fluid flow passage, and between the fourth fluid flow passage and the second fluid flow passage and the other of the bungee followers and the reciprocating spool valve in the other of its limiting positions permitting flow through one of the fluid flow connections only between the third fluid flow passage and the second fluid flow passage, and between the first fluid flow passage and the fourth fluid flow passage so that fluid flow in either direction through the third and fourth fluid flow passages is directed in the same direction through the first and second fluid flow passages of the housing.

16. A hydrostat system comprising a hydraulic pump; a hydraulic motor; a fluid line operatively connecting the pump with the motor, and arranged to carry fluid flow therebetween in either direction; a filter interposed in the fluid line between the pump and the motor, for filtration of fluid in either direction of flow from the pump to the motor; and a bidirectional flow control spool valve in fluid flow-controlling connection with the fluid line and with fluid lines in series flow connection to and from the filter, and responsive to differential fluid pressure thereacross arising from flow of fluid in either direction through the fluid line and a valve flow passage in series with the filter to direct flow through the filter in the same direction, the bidirectional flow control spool valve comprising a valve housing; a plurality of fluid flow passages through the housing; and as valve elements a spool valve and two bungee followers, each reciprocating between two limiting positions along a longitudinal axis, the spool valve moving into and away from actuating contact with a bungee follower in each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one fluid flow passage to a unidirectional function and through one fluid flow passage from the unidirectional function receiving and returning the flow to the fluid line continuing in the same direction, and when the spool valve is in actuating contact with the other bungee follower, in the other limiting position, the spool valve and bungee follower accept flow through the fluid line from the opposite direction, and direct it through the same fluid flow passage to the unidirectional function and also accept flow from the same fluid flow passage from the unidirectional function and direct this flow back into the fluid line continuing in the same opposite direction; the spool valve being provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower.

17. A hydrostat system according to claim 16, in which the spool valve has valve elements which are sufficiently light in weight to reciprocate between open and closed positions within several milliseconds.

18. A hydrostat system in accordance with claim 17, in which the valve elements are tubular and have open central passages for flow of fluid therethrough.

19. A hydrostat system in accordance with claim 18, in which the bungee followers are twins facing in opposite directions.

20. A hydrostat system in accordance with claim 16 in which the valve comprises a reciprocable spool valve having side sealing surfaces, reciprocable between first and second limiting positions, respectively, along a valve seat; a fluid pressure-receiving surface operatively connected to one side of the reciprocable spool valve; and second fluid pressure-receiving surface operatively connected to the opposed side of the spool valve; differential fluid pressure arising from fluid flow in either direction in the fluid line applied to the first and second pressure-receiving surfaces urging the valve in opposite directions, towards or away from one of its limiting positions; first and second bungee followers, each disposed to be actuated in one of the limiting positions of the reciprocating spool valve, the first bungee follower being actuated by the spool valve in its first portion, and the second bungee follower being actuated by the spool valve in its second position; first and second bias means urging the first and second bungee followers, respectively, in one direction, and the spool valve urging the bungee followers in the opposite direction; first and second flow passages in the valve housing for connection in series to opposite sides of a function and in fluid flow connection with each other via the function; third and fourth fluid flow passages in the housing for connection in series to a fluid line, accepting fluid flow therethrough in either direction; fluid flow connections controlled by the spool valve and bungee followers between the first fluid flow passage and each of the third and fourth flow passages and between the second fluid flow passage and each of the third and fourth fluid flow passages; one of the bungee followers and the reciprocating spool valve in one limiting position of the spool valve permitting flow through one of the fluid flow connections only between the third fluid flow passage and the first fluid flow passage, and between the fourth fluid flow passage and the second fluid flow passage, and the other of the bungee followers and the reciprocating spool valve in the other of its limiting positions permitting flow through one of the fluid flow connections only between the third fluid flow passage and the second fluid flow passage, and between the first fluid flow passage and the fourth fluid flow passage, so that fluid flow in either direction through the third and fourth fluid flow passages is directed in the same direction through the first and second fluid flow passages of the housing.

21. A hydrostat system comprising a hydraulic pump; at least one hydraulic motor; a fluid line operatively connecting the pump with each hydraulic motor, and arranged to carry fluid flow therebetween in either direction; a filter interposed in the fluid line between the pump and the hydraulic motor, for filtration of fluid in at least one direction of flow from the pump to the hydraulic motor, and a bidirectional flow control spool valve in fluid flow controlling connection with the fluid line and with fluid lines in series flow connection to and from the hydraulic motor, and responsive to differential fluid pressure thereacross arising from flow of fluid in either direction through the fluid line and a valve flow passage in series with the hydraulic motor, to direct flow through the hydraulic motor in the same direction, the bidirectional flow control spool valve comprising a valve housing; a plurality of fluid flow passages through the housing; and as valve elements a spool valve and two bungee followers, each reciprocating between two limiting positions along a longitudinal axis, the spool valve moving into and away from actuating contact with a bungee followerin each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one fluid flow passage to a unidirectional function and through one fluid flow passage from the unidirectional function receiving and returning the flow to the fluid line continuing in the same direction, and when the spool valve is in actuating contact with the other bungee follower, in the other limiting position, the spool valve and bungee follower accept flow through the fluid line from the opposite direction, and direct it through the same fluid flow passage to the unidirectional function and also accept flow from the same fluid flow passage from the unidirectional function and direct this flow back into the fluid line continuing in the same opposite direction; the spool valve being provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower.

22. A hydrostat system according to claim 21, in which the spool valve has valve elements which are sufficiently light in weight to reciprocate between open and closed positions within several milliseconds.

23. A hydrostat system in accordance with claim 22 in which the valve elements are tubular and have open central passages for flow of fluid therethrough.

24. A hydrostat system in accordance with claim 23 in which the bungee followers are twins facing in opposite directions.

25. A hydrostat system comprising a hydraulic pump; at least one hydraulic motor; a fluid line operatively connecting the pump with each motor, and arranged to carry fluid flow therebetween in either direction; a filter interposed in the fluid line between the pump and the motor, for filtration of fluid in at least one direction of flow from the pump to the motor; and two bidirectional flow control spool valves, of which valve one is in fluid flow-controlling connection with the fluid line and with fluid lines in series flow connection to and from the motor, and responsive to differential fluid pressure thereacross arising from flow of fluid in either direction through the fluid line and a valve flow passage in series with the motor, to direct flow through the motor in the same direction, and the second valve is in fluid flow-controlling connection with the fluid line and with fluid lines in series flow connection to and from the filter, and responsive to differential fluid pressure thereacross arising from flow of fluid in either direction through the fluid line and a valve flow passage in series with the filter to direct flow through the filter in the same direction, each bidirectional flow control spool valve comprising a valve housing; a plurality of fluid flow passages through the housing; and as valve elements a spool valve and two bungee followers, each reciprocating between two limiting positions along a longitudinal axis, the spool valve moving into and away from actuating contact with a bungee follower in each of its two limiting positions, the spool valve and one of each of the bungee followers being linked in each of the limiting positions in their response to fluid flow, so that when the spool valve is in one position, it together with one bungee follower accepts flow from one direction in a fluid line and directs it through one fluid flow passage to a unidirectional function and through one fluid flow passage from the unidirectional function, receiving and returning the flow to the fluid line continuing in the same direction, and when the spool valve is in actuating contact with the other bungee follower, in the other limiting position, the spool valve and bungee follower accept flow through the fluid line from the opposite direction, and direct it through the same fluid flow passage to the unidirectional function and also accept flow from the same fluid flow passage from the unidirectional function and direct this flow back into the fluid line continuing in the same opposite direction; the spool valve being provided with fluid pressure-actuating surfaces on opposite sides so as to be responsive to fluid pressure differential across the function and the spool valve arising from flow of fluid in each of the opposite directions through the fluid line, the valve being responsive to fluid pressure differential arising from flow in one direction through the fluid line, and thereby driven against one bungee follower, and being responsive to fluid pressure differential arising from flow in the opposite direction through the fluid line, and thereby being driven against the other bungee follower.

* * * * *

UNITED STATES PATENT AND TRADEMARK OFFICE
CERTIFICATE OF CORRECTION

PATENT NO. : 4,439,984
DATED : April 3, 1984
INVENTOR(S) : Francis Martin

It is certified that error appears in the above-identified patent and that said Letters Patent are hereby corrected as shown below:

Column 2, line 58 : "valve s" should be --valves--
Column 2, line 65 : "lare" should be --large--
Column 3, line 35 : "Figure 1" should be --Figure A--
Column 13, line 61 : "l1" should be --L1--
Column 15, line 31 : after "fluid" insert --flow--
Column 20, line 24 : "followerin" should be -- follower in--
Column 21, line 3 : "valve" should be --valves--

Signed and Sealed this

First Day of October 1985

[SEAL]

Attest:

DONALD J. QUIGG

Attesting Officer

Commissioner of Patents and
Trademarks—Designate